H. E. Smith,

Washing Machine,

No. 694. Reissued Apr. 19, 1859.

UNITED STATES PATENT OFFICE.

HAMILTON E. SMITH, OF PHILADELPHIA, PENNSYLVANIA.

IMPROVED WASHING-MACHINE.

Specification forming part of Letters Patent No. 21,909, dated October 26, 1858; Reissue No. 694, dated April 19, 1859.

*To all whom it may concern:*

Be it known that I, HAMILTON E. SMITH, of the city and county of Philadelphia, and State of Pennsylvania, have invented certain new and useful Improvements in Washing-Machines; and I do hereby declare the following to be a full, clear, and exact description of the same, reference being had to the accompanying drawings, and to the letters of reference marked thereon.

My invention relates to an improvement in washing-machines in which a reciprocating plunger is used to act on the clothes contained in a tub or other vessel; and my improvement consists in placing within the vessel a valved diaphragm, and above the latter a perforated diaphragm or its equivalent, both diaphragms being arranged to yield together to the pressure of the plunger on the clothes, and to return to their former positions on the removal of this pressure, the whole being combined with two pipes connected to any suitable heating apparatus and communicating with the vessel, one above and the other below the diaphragms, so that portions of the cooler water at the upper end of the tub may pass into the heater and a supply of reheated water be brought to act on the clothes by the action of the plunger. The latter is of the peculiar construction described hereinafter, so that on the depression of the said plunger on the clothes above the yielding diaphragm small forcible jets of water are caused to pass through the interstices of the clothes, which are thereby thoroughly and rapidly cleansed, the jets of water, after passing through the clothes, being directed downward into the vessel by a flange on the plunger, which thus prevents any inconvenient splashing.

In order to enable others to make and use my invention, I will now proceed to describe its construction and operation.

Figure 1:
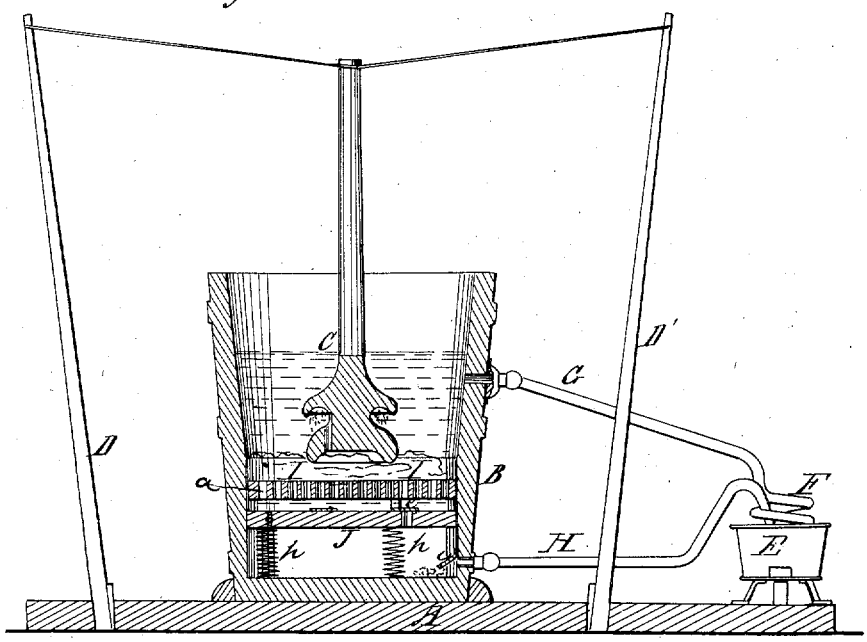
Figure 2:
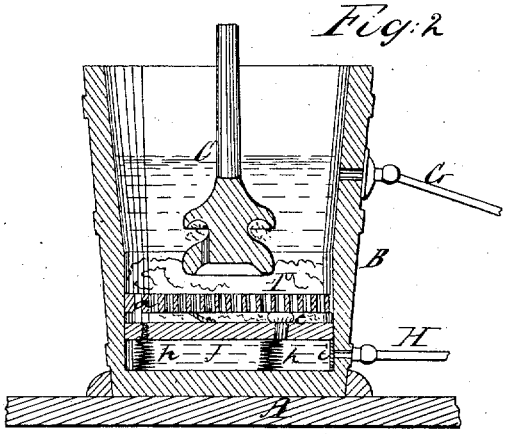

On reference to the accompanying drawings, which form a part of this specification, Figure 1 is a sectional elevation of my improved washing-machine with the plunger in the act of being raised; Fig. 2, a section of a portion of the machine, with the plunger pressed down on the clothes.

A is the foundation-plate of the apparatus; B, the wash-tub; C, the plunger attached to a cord or wire, the opposite ends of which are connected to the spring-posts D and D′, secured to the foundation A.

E is the fire-place, F a coiled tube within the same, and G and H pipes connected to and communicating with both the coil and wash-tub. The sides of the latter toward the bottom are parallel, and in this parallel portion two diaphragms, I and J, fit snugly, but so as to move freely. The upper diaphragm, I, is perforated with a number of holes and has any convenient number of pins *a*, which rest on the upper surface of the diaphragm J. The two diaphragms are thus maintained a short distance apart. In the lower diaphragm, J, are any convenient number of openings with valves *e* on the top, the said valves opening upward, and between the diaphragm J and the bottom of the tub intervene any suitable number of spiral or other suitable springs, *h*. The orifice which forms the communication between the pipe H and the tub is furnished with a valve, *i*, and both pipes may be supplied with cocks to regulate the flow of water through the same.

The plunger *c* is formed at its lower end in the peculiar manner illustrated in the drawings. The enlarged end has a recess, *m*, which is bounded by a flange, *n*, and is perforated with any convenient number of orifices, *p*, immediately above which the plunger has another enlargement, *q*, equal, or thereabout, in diameter to the lower enlargement and slightly hollowed on the under side.

Sufficient water being placed in the tub to raise the level of the water above the orifice communicating with the pipe G, and the fuel being ignited in the fire-place E, the clothes are placed on the upper perforated diaphragm and pressed upon by repeated strokes of the plunger C. As the latter descends both the upper and lower diaphragms will be depressed to an extent depending upon the amount of pressure and rigidity of the springs *h*. The water, which had become heated in the coil and had previously passed through the pipe H into the space between the lower diaphragm, J, and the bottom of the tub, now that the diaphragms are depressed and the valve *i* consequently closed, will rush through the orifices of the lower diaphragm, and thence through those of the upper diaphragm and act on the clothes prior to passing to the space above. During this depression of the plunger the water which has passed from the upper portion of the tub through the pipe G into the coil F becomes increased in temperature, and the moment the plunger is raised the diaphragms, through the recoil of the springs *h*, will be elevated, and the valves of the lower diaphragm being closed, it will act in the same manner as the piston of a pump, causing a partial vacuum beneath, opening the valve *i*, and allowing the reheated water, or water and steam combined, to fill the lower compartment preparatory to being driven through the perforations of the diaphragms, as before, by the descent of the plunger on the clothes.

It will thus be seen that at every stroke of the plunger a supply of reheated water is withdrawn from the coil and brought to bear on the clothes, while the supply is replaced in the coil from the partially-cooled water near the top of the tub. The action of this superheated water, as a means of effectually and rapidly cleansing the clothes, will be too obvious to need further description.

During the above described operation the position of the plunger is changed so as to act on every part of the clothes. Now the pressure of the plunger causes the diaphragms to yield and the water consequently to be forced through the perforations in small forcible jets. At each successive pressure of the plunger on the clothes a portion of the latter equal in size to the enlarged end of the plunger is confined by the flange *n*, and held firmly against the upper diaphragm as the latter yields. The jets of water passing through those perforations of the plunger can thus pass in no other direction than through the interstices of that portion of the clothes tightly held by the flange *n*. The perforations *p* allow a free escape of the water which passes through the clothes, and prevent the accumulation of compressed air in the vacuity *m*.

The upper enlargement of the plunger tends, by its concavity on the under side, to direct the jets of water which pass through the perforations *p* downward, and thus prevents inconvenient splashing.

I do not desire to confine myself to the use of a coil for superheating the water, as other heating apparatus equally as efficient might be used; but

I claim and desire to secure by Letters Patent—

1. The vessel B, with its yielding valved diaphragm J and the perforated diaphragm I, or its equivalent, in combination with a pipe, G, communicating with the vessel at a point above and the pipe H at a point below the said diaphragm, and both pipes communicating with any suitable heating apparatus, substantially as and for the purpose set forth.

2. The reciprocating plunger C, with its enlarged end constructed as set forth—namely, with the recess *m*, flange *n*, and perforations *p*, in combination with the yielding diaphragm I, for the purpose specified.

3. Providing the plunger C with an upper enlargement, *q*, concave on the under side and arranged in respect to the lower plunger, substantially as and for the purpose set forth.

In testimony whereof I have signed my name to this specification in the presence of two subscribing witnesses.

HAMILTON E. SMITH.

Witnesses:

HENRY HOWSON,

CHARLES D. FREEMAN.